April 10, 1934.   C. MORROW   1,954,217
VALVE
Filed July 9, 1931   2 Sheets-Sheet 1

INVENTOR.
Clifford Morrow
BY Geo. B. Pitts
ATTORNEY.

Patented Apr. 10, 1934

1,954,217

UNITED STATES PATENT OFFICE 1,954,217

VALVE

Clifford Morrow, Canton, Ohio, assignor to The H. H. Miller Industries Company, Canton, Ohio, a corporation of Ohio Application July 9, 1931, Serial No. 549,596

2 Claims. (Cl. 137—21)

This invention relates to a liquid container, more particularly to the discharge valve therefor. The invention is particularly applicable to containers for holding milk and cream.

One object of the invention is to provide an improved valve having means for supplying a sterilizing medium to the conduit of the valve and means for draining any liquid that may leak through the valve or result from the supplied medium.

Another object of the invention is to provide an improved valve having provision for the escape exteriorly of its casing of any liquid that may leak past the outlet for the container.

Another object of the invention is to provide a valve that is relatively simple in construction and easily disassembled for cleaning.

Other objects of the invention will be apparent to those skilled in the art to which my invention relates from the following description taken in connection with the accompanying drawings, wherein Fig. 1 is a fragmentary view showing a portion of a container and a valve embodying my invention.

Figure 1:
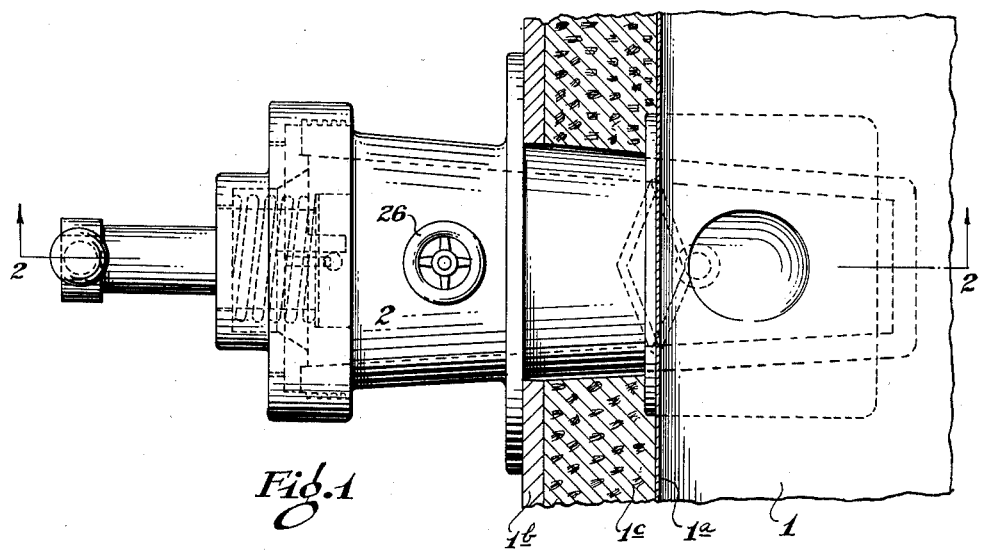

In the drawings, 1 indicates a container for liquid, only a portion thereof being shown. In the application of my invention, I propose to fill the container with milk or cream and if desired such container may be provided with stirring or circulating means or means for circulating a heat transfer medium, or both such means when desired. In such application, the walls of the container are constructed to insure insulation to prevent the transfer of heat through them. As illustrating the preferred construction, the inner wall 1a and outer wall 1b may be formed from any suitable material and the space between these walls is filled with a suitable non-conductor of heat material, such as cork 1c. The container 1 may be of any suitable shape in cross section.

2 indicates as an entirety the valve to control the discharge of the liquid from the container. The valve may be constructed to control the discharge through an outlet 3 located at any desirable position, preferably in the bottom 1x of the container. In the construction shown, the outlet 3 is disposed relatively close to one side wall, indicated at 1x', whereby the length of the valve structure is reduced and the operating handle 4 may be conveniently located. The wall or walls of the container 1 are cut away, as shown at 5 to accommodate the casing 6 of the valve 2, the casing being provided with one or more flanges 7, 7a, 7b, by means of which it is secured in any well known manner to the container walls 1x, 1x'.

The inner end of the casing is closed by a wall 8. The upper side wall of the casing 6 is provided with an opening 6a which registers with the opening 3. By preference, the walls of the opening 6a are tapered or inclined and the inner wall 1a of the container is bent down into face to face relation with these tapered walls and extends to or slightly beyond their edges to eliminate ledges or corners on or in which portions or partiticles of the liquid can accumulate, instead of flowing out through the valve. The outer end of the casing is provided with a collar 9, threaded on its outer side surface, to removably take a threaded coupling 10. The coupling 10 is provided with an inwardly extending shoulder 11 which engages a coupling element 12. The coupling element 12 is preferably provided with a pin 12a which extends into a recess 9a formed in the end wall of the casing 9 to lock the element 12 against turning. The outer end of the element 12 is provided with an inturned flange 13, the purpose of which will later appear.

The lower side wall of the casing 6, diametrically opposite the opening 6a, but outwardly relative thereto, is formed with an outlet opening 6a'. As shown, the walls of the casing surrounding the opening 6a' as shaped to provide a pipe section 6x to which is suitably connected a fitting 6x' having a threaded wall, by means of which a discharge conduit (not shown) may be detachably connected to the fitting to convey away the liquid in the container 1.

14 indicates a valve element rotatably fitting the casing 6 and provided at its outer end with a shank 15, which extends through the coupling element 12 and carries a handle 16. The inner wall of the casing 6 is conical shaped to form a seat for the outer wall of the valve element 14 which is correspondingly shaped, whereby a coiled spring 17 surrounding the shank 15 and interposed between the flange 13 and a shoulder 18, provided on the valve element, may yieldingly maintain the valve element in engagement with its seat.

Figure 2:
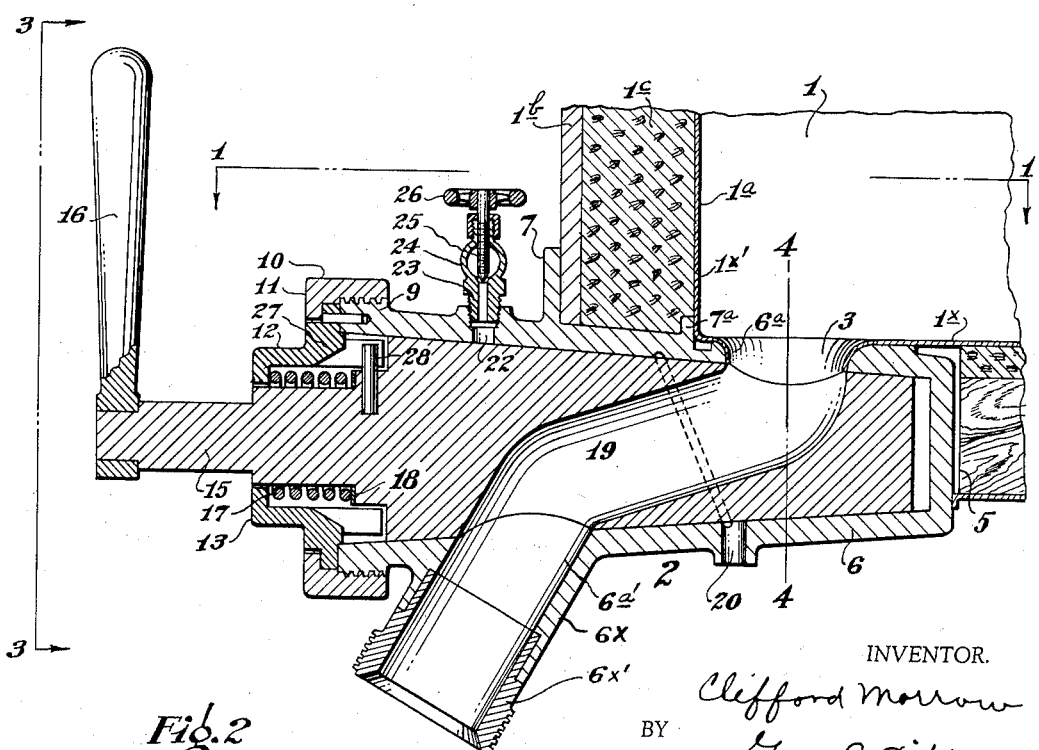
Fig. 2 is a section on the line 2—2 of Fig. 1.
Figure 3:
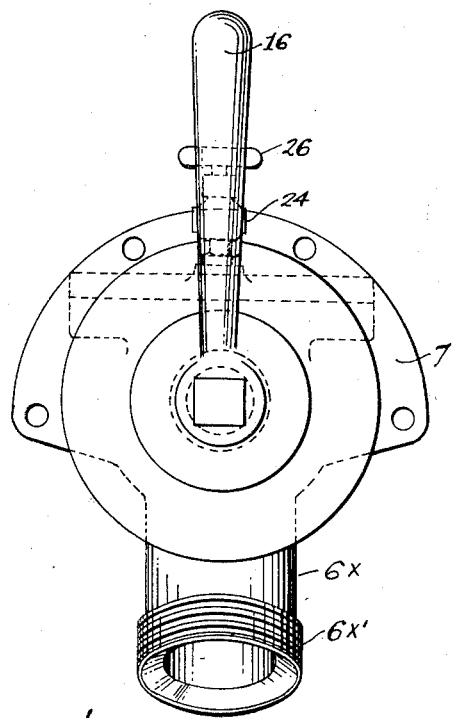
Fig. 3 is a front view of the parts shown in Figs. 1 and 2.
Figure 4:
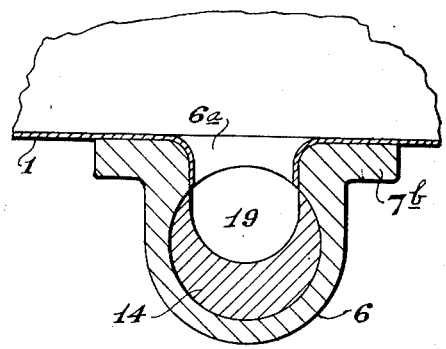
Fig. 4 is a section on the line 4—4 of Fig. 2.

19 indicates a conduit or channel extending at an angle through the valve element, and so disposed that when the valve element is in the liquid discharging position, as shown in Fig. 2, the inlet port of the conduit 19 registers with the opening 6a and the outlet port of the conduit registers with the opening 6a'. When the valve element is rotated far enough to move these ports out of registry, the valve is closed.

Figure 5:
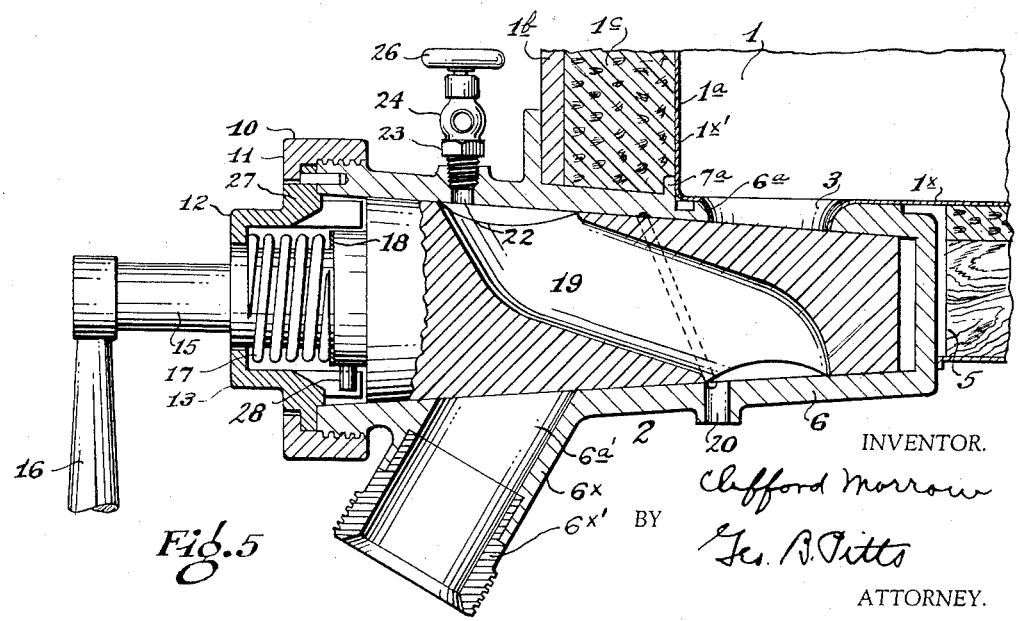
Fig. 5 is a fragmentary section on the line 2—2 of Fig. 1, but showing a portion of the valve element in side elevation and in closed position.

20 indicates a through opening formed in the lower wall of the casing 6 rearward of the opening 6a' and adapted to serve as a discharge opening for liquid which may leak past the inlet port. The opening 20 is disposed diametrically opposite the opening 6a, so that when the valve element 14 is rotated a half turn (see Fig. 5) or substantially a half turn the inlet port of the conduit 19 will register with the opening and permit the discharge of excess liquid adhering to the walls of the conduit, also steam discharged into the conduit as later set forth and water of condensation resulting from the steam. The inner wall of the valve casing 6 is formed with a groove 21 which extends from its uppermost side outwardly of the inlet port of the conduit 19 around both sides of the casing to its lowermost side thereof, inwardly of the outlet port of the conduit, and connects at its latter end with the discharge opening 20. As the opposite portions of the groove 21 are inclined downwardly and inwardly, any escaping liquid or water of condensation will collect in the groove and gravitate to the opening 20.

22 indicates an opening formed in the upper side wall of the casing 6 diametrically opposite the discharge opening 6a', so that when the valve element is rotated a half turn, or substantially so, the outlet port of the conduit 19 registers with the opening 22. The walls of the opening 22 are threaded to receive a nipple 23 provided on the wall of a valve casing 24, which is connected with a steam supply pipe (not shown). The valve casing 24 is provided with a valve seat, controlled by a needle valve 25, which is adjusted by the handle 26. The needle valve 25 is adjusted to admit a predetermined amount of steam through the nipple, so that each time the valve element 14 is rotated to closed position (see Fig. 5), steam is automatically injected into the conduit 19 to sterilize the walls thereof. As the conduit 19, when in this position, registers with the opening 20, it will be seen that excess steam and water of condensation will flow through the latter and escape.

I provide means for limiting the rotation of the valve element, so that the operative may readily determine when the valve is fully opened and fully closed. For this purpose, the inner wall of the coupling element 12 is cut-away, as shown at 27 to accommodate the movement of a pin 28, which is fixed to and extends laterally from the shank 15 of the valve element 14 so as to engage the side walls of the cutaway in either direction of rotation of the valve element 14.

From the foregoing description it will be seen that provision is made for sterilizing the walls of the valve and for effecting automatic or self drainage of leakage and water of condensation and that all steam supplied for sterilization is conducted into direct contact with the conduit walls of the valve and may be exhausted direct to the atmosphere. It will also be seen that the valve element may readily be removed by removal of the elements 10 and 12. Furthermore, these features have been incorporated with a flush-type of valve wherein the cut-off takes place at the bottom wall of the container and not below or above it; also that no part of the valve structure projects within the container or into its discharge opening and that the removal of the valve is effected endwise by disassembly of parts positioned at the outer end of the valve.

To those skilled in the art to which my invention relates many changes in construction and widely differing embodiments and applications of the invention will suggest themselves without departing from the spirit and scope of the invention. My disclosures and the description herein are purely illustrative and are not intended to be in any sense limiting.

What I claim is:

1. In apparatus of the class described, the combination of a container having an outlet in its lower portion, a hollow casing associated with the container walls and extending laterally in a direction substantially at right angles to the axis of said outlet, said casing forming a seat and having an opening registering with said outlet and a separate opening in diametrical relation to said first mentioned opening but off-set longitudinally of said casing, a valve element rotatably fitting said casing and formed with an inclined conduit having ports adapted to simultaneously register with said openings in one position of said valve, said casing being formed with a drain opening arranged to register with the inlet and of said conduit when said valve element is in closed position, and the inner wall of said casing being formed with a groove extending in an inclined direction from the upper side thereof outwardly of the first mentioned opening to its lower side inwardly of the said separate opening and connected on the latter side with said drain opening, and means at the outer ends of said casing and valve element for retaining the latter in position.

2. In apparatus of the class described, the combination of a container having an outlet, a hollow conical casing associated with the container walls and extending laterally in a direction substantially at right angles to the axis of said outlet, said casing forming a seat and having a discharge opening registering with said outlet and a separate discharge opening in diametrical relation to said first mentioned opening but off-set longitudinally of said casing, a conical valve element rotatably fitting said casing and formed with an inclined conduit having ports adapted to simultaneously register with said openings in one position of said valve, said casing being formed with a drain opening arranged to register with the inlet end of said conduit when said valve element is in closed position, a steam supply inlet in said casing arranged to register with the outlet end of said conduit when said valve element is in closed position, means for maintaining said valve element in seating relation to said casing, and means for limiting the rotation of said valve element whereby the ports of its conduit simultaneously register with said discharge openings in one position and with said steam inlet and drain opening in another position.

CLIFFORD MORROW.